(No Model.)   5 Sheets—Sheet 1.
C. B. McDONALD
DRYING APPARATUS.
No. 568,096. Patented Sept. 22, 1896.
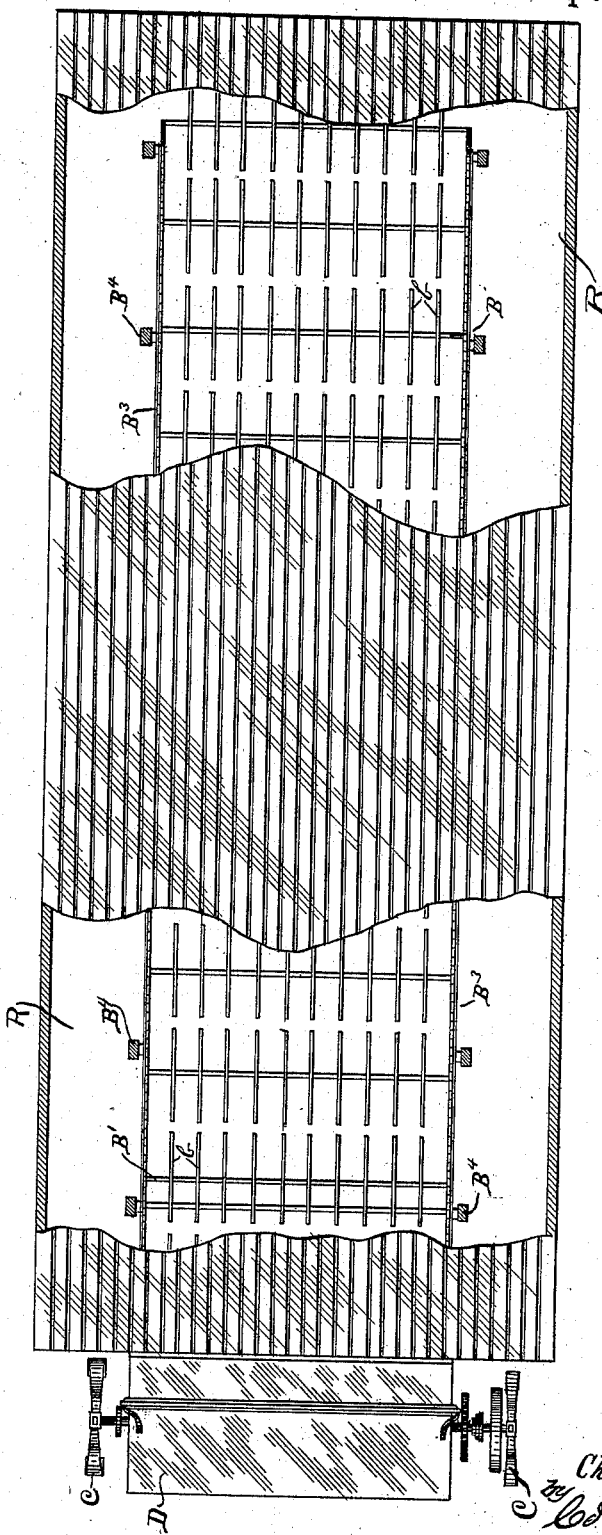
Witnesses
C. F. Blake
H. G. Strong
Inventor
Chas. B. McDonald
by Coburn T Keecher
Atty.

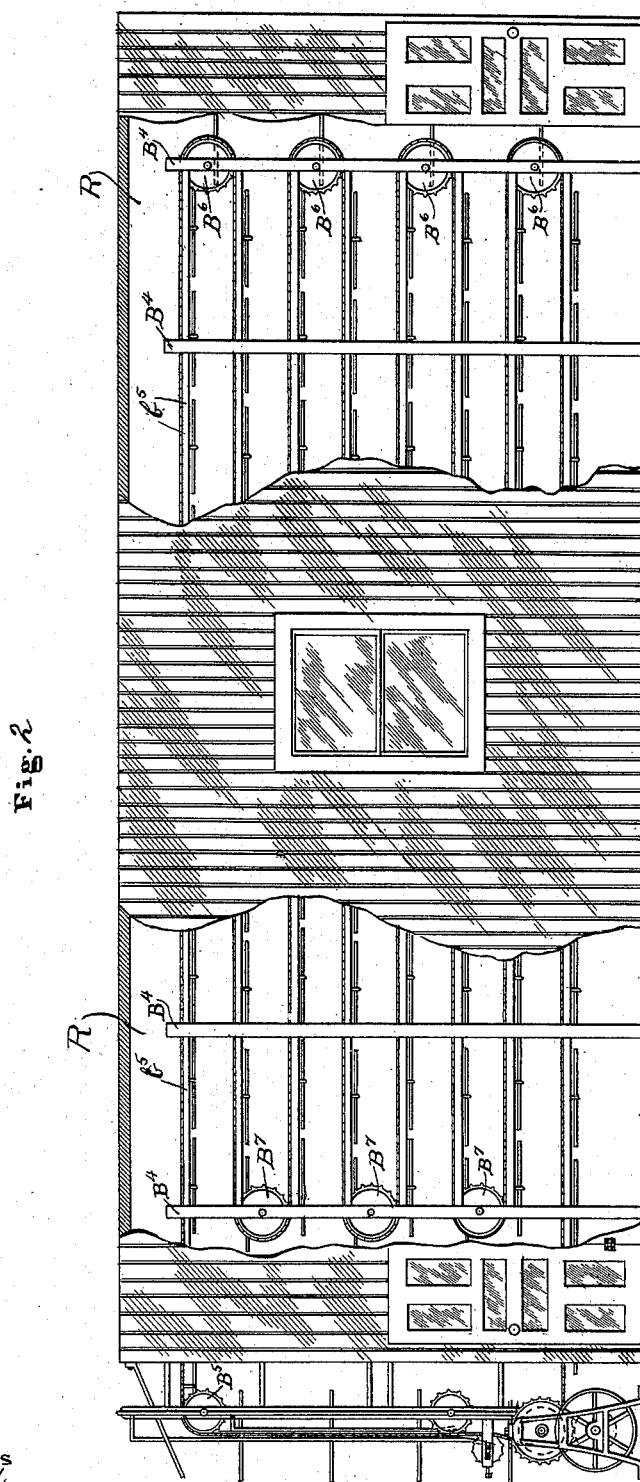

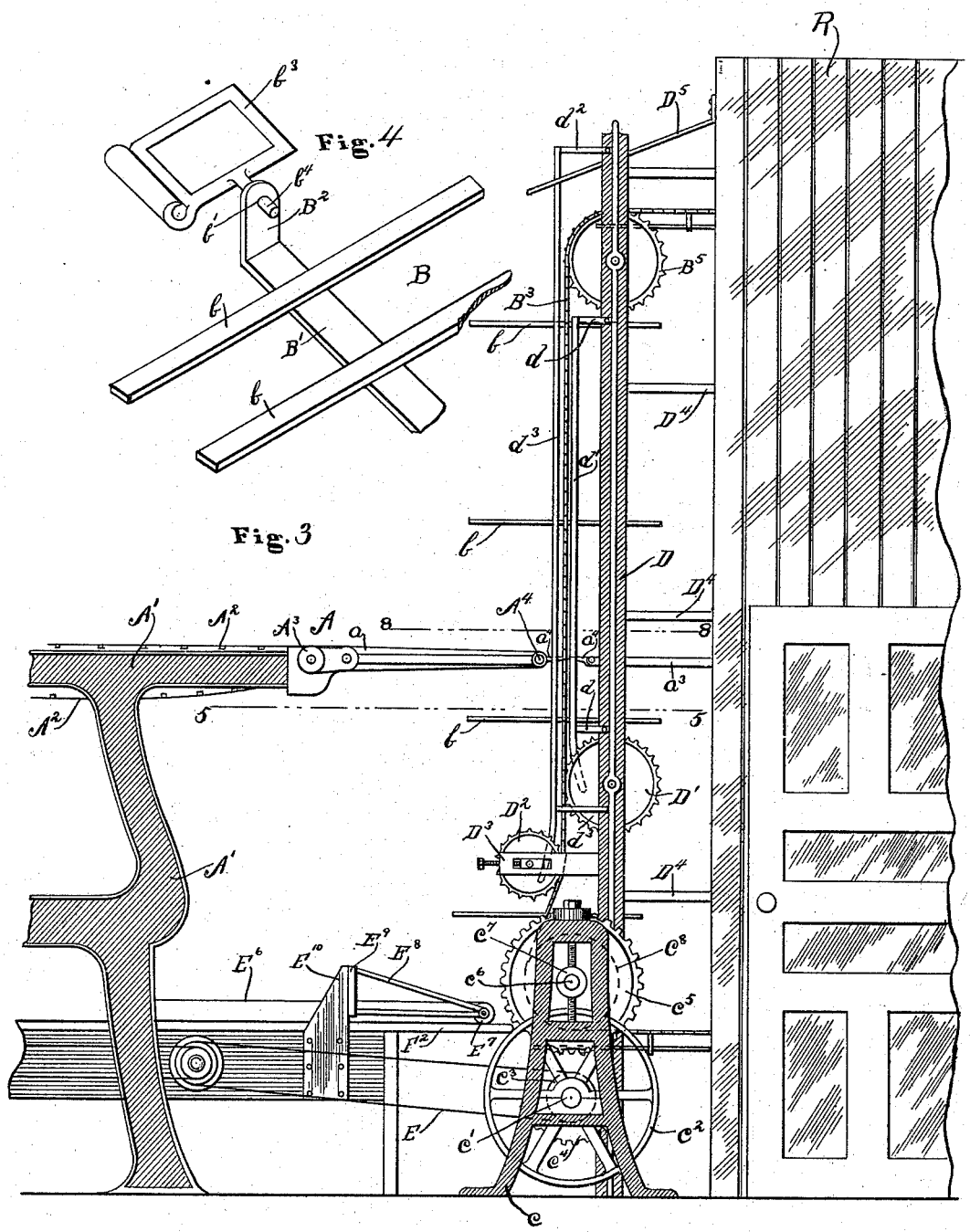

(No Model.) 5 Sheets—Sheet 4.
C. B. McDONALD.
DRYING APPARATUS.
No. 568,096. Patented Sept. 22, 1896.
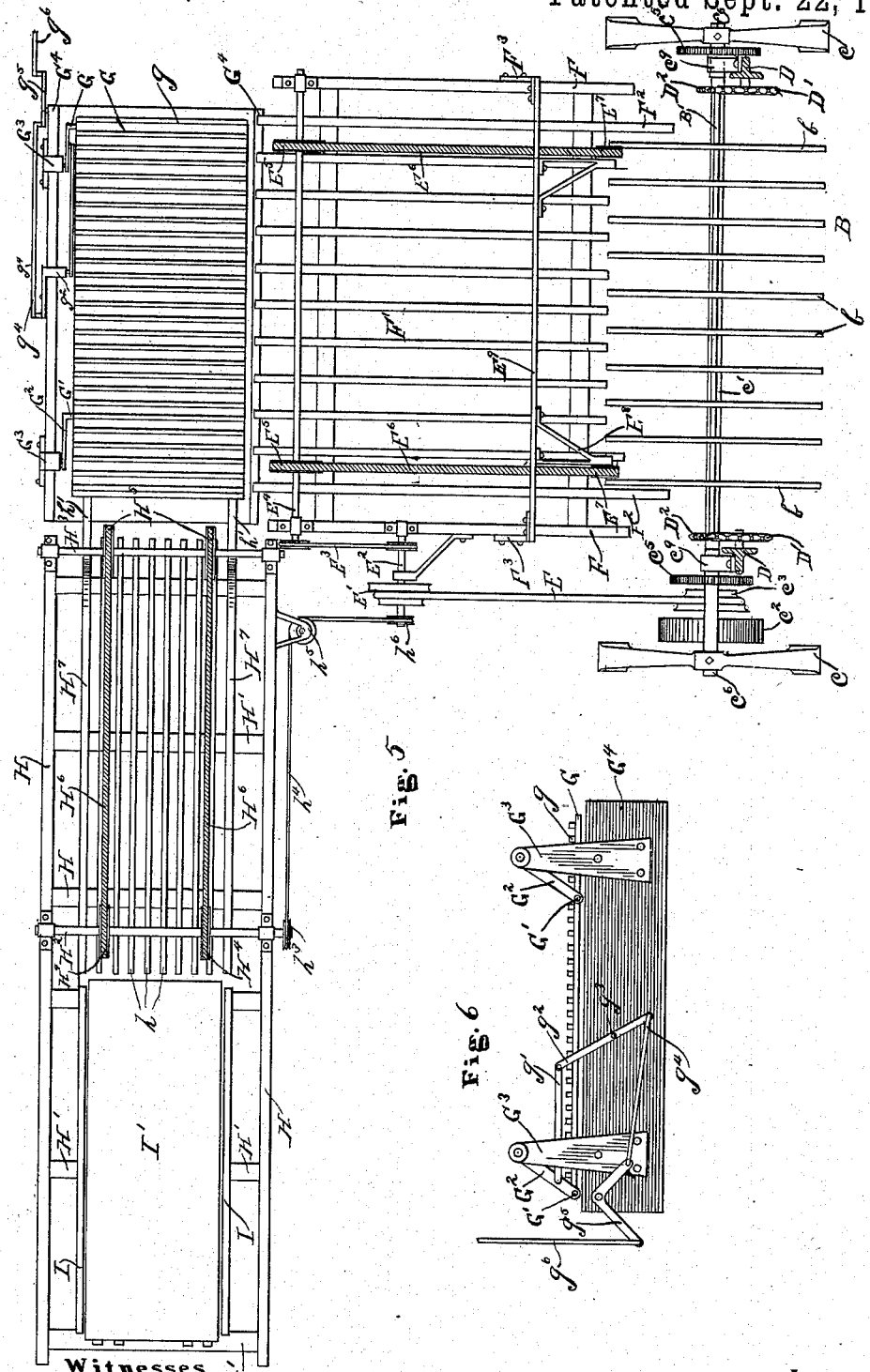
Witnesses
C. F. Blake
H. G. Strong
Inventor
Chas. B. McDonald
By Coburn & Thacher
Atty.

(No Model.)
C. B. McDONALD.
DRYING APPARATUS.
No. 568,096. Patented Sept. 22, 1896.
5 Sheets—Sheet 5.
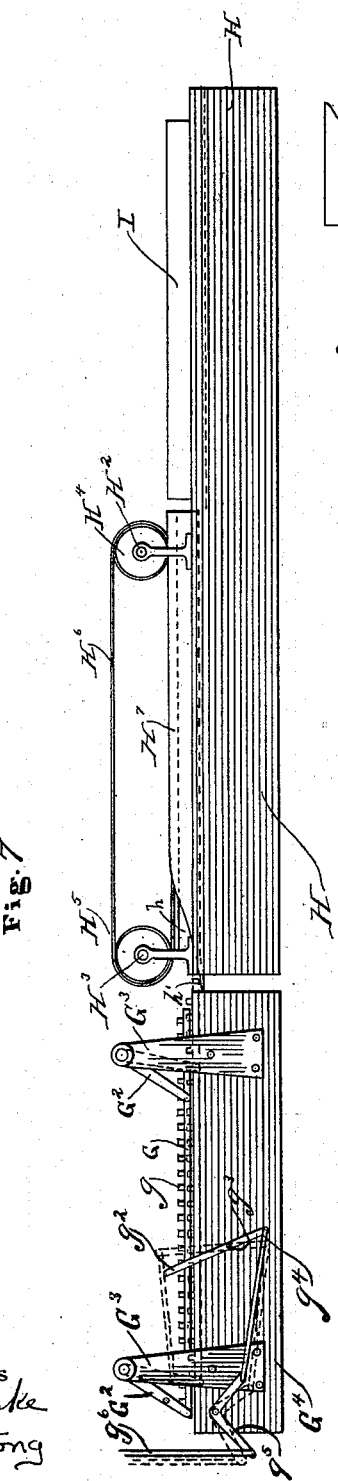
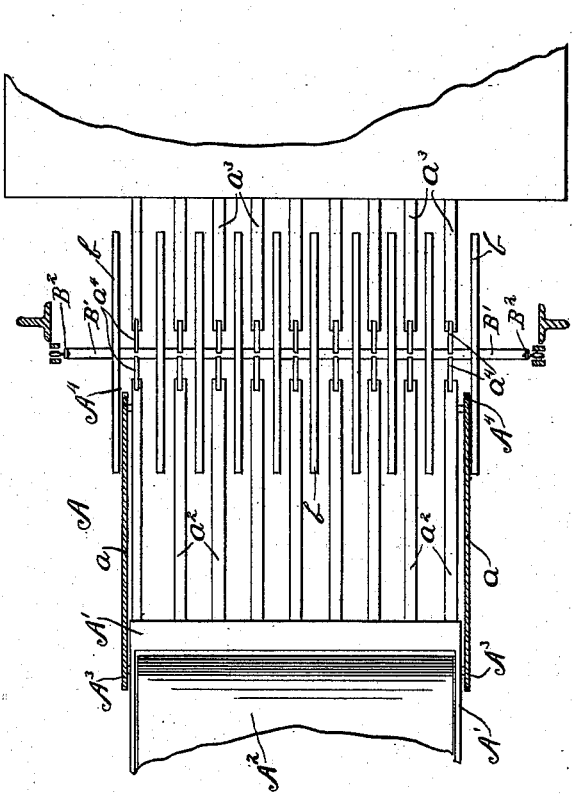
Witnesses
C. F. Blake
H. G. Strong
Inventor
Chas. B. McDonald.
Coburn T Thacher
Atty.

UNITED STATES PATENT OFFICE.

CHARLES B. McDONALD, OF CHICAGO, ILLINOIS, ASSIGNOR OF ONE-HALF TO JONATHAN O. ARMOUR, OF SAME PLACE.

DRYING APPARATUS.

SPECIFICATION forming part of Letters Patent No. 568,096, dated September 22, 1896.

Application filed December 6, 1895. Serial No. 571,215. (No model.)

*To all whom it may concern:*

Be it known that I, CHARLES B. MCDONALD, a citizen of the United States, residing at Chicago, in the county of Cook and State of Illinois, have invented a certain new and useful Improvement in Conveying and Drying Apparatus, which is fully set forth in the following specification, reference being had to the accompanying drawings, in which—

Figure 1 is a plan of my drying-room with part of the top broken away. Fig. 2 is a side elevation of the said drying-room with part of the side broken away. Fig. 3 is an enlargement of the left-hand side of Fig. 2, showing the loading and unloading mechanism in elevation. Fig. 4 is a detail perspective of part of one of the label-carriers. Fig. 5 is a plan view of the unloading mechanism below the line 5 5 of Fig. 3. Fig. 6 is a detail side elevation of the vibrating platform shown in plan in Fig. 5. Fig. 7 is a side elevation of the said platform and of the adjacent devices for receiving the dried labels. Fig. 8 is a plan view of a portion of the loading mechanism below the line 8 8 of Fig. 3.

My invention consists of an apparatus for drying labels which have received a coat of varnish on their printed sides. This apparatus comprises a drying-room, into and out of which moves an endless carrier, devices for loading the wet labels upon the entering portion of the said carrier, and devices for unloading the dried labels from the said carrier as it emerges from the drying-room.

Referring now to the drawings by letter, A represents the loading mechanism, which is shown in elevation in Fig. 3 and in plan in Fig. 8. This loading mechanism is supported upon a framework A', of any suitable construction, which carries an endless apron $A^2$, upon which the labels are brought forward to the loading device. Two endless tapes $a\ a$, which pass about the pulleys $A^3$ and $A^4$, receive the labels from the apron $A^2$ as they are brought forward by the said apron, one after another, and carry the said labels forward, so that each label is deposited upon the slats $a^2$ and $a^3$, the center of the label being approximately over the space between the ends of the two adjacent rows of the said slats. Partly closing the said space and pivoted to the ends of the said slats $a^2$ and $a^3$ are the fingers $a^4$, the free ends of which approximately meet across the said opening. As successive carriers B move upward, the central bar B' of each passes through the aforesaid opening, striking up the fingers $a^4$. The transverse slats $b$ of the said carrier alternate with and pass between the slats $a^2$ and $a^3$, and so receive and carry upward the label which is resting upon the last-named slats. The movement of the feeding-apron $A^2$ and the feed-tapes $a$ must of course be so timed with reference to the movement of the carriers B that each carrier as it passes upward through the loading device will find a label awaiting it thereupon.

Each carrier B consists of a longitudinal bar B', turned upward at each end to form an ear $B^2$, provided with an eye $b'$. Upon the said central bar B' are arranged the transverse slats $b$, upon which the label rests during its transport through the drying-room. The label-carriers are supported from and moved by two endless sprocket-chains $B^3$, certain links of which, $b^3$, carry each a pin or projection $b^4$, adapted to fit loosely within the eye $b'$ of the label-carrier. The said two sprocket-chains pass over the sprocket-wheels $B^5$, journaled in suitable supports outside of and near the top of one end of the label-drying room, and through an aperture into the end of said room.

The drying-room R is provided with two rows of uprights $B^4$. The end uprights carry two series of sprocket-wheels $B^6$ and $B^7$, respectively, at opposite ends of the room, so arranged that the sprocket-chains pass over and under the sprocket-wheels $B^6$, backward to the other end of the room and over and under the sprocket-wheels $B^7$, again across the room to other sprocket-wheels $B^6$, and so on in succession, according to whatever number of sprocket-wheels it shall be found convenient to employ, and finally out through an aperture in the lower portion of the same end of the drying-room R as that by which the said sprocket-chains enter it, as above. The intermediate uprights $B^4$ are provided with the strips or guides $b^5$, which serve to support the conveyer between the sprocket-wheels at the opposite ends of the room. Upon passing out of the said drying-room the chains pass over and receive their motion from sprocket-wheels $c^8$, which will presently be described. By the construction of the chains and the label-carriers which they support it will be apparent that the said label-carriers, being pivoted upon the pins $b^4$, will always retain the same horizontal position without being affected by the change in direction of the sprocket-chains as they pass over the several wheels referred to. Thus a label entering the said drying-room upon one of the carriers will be conveyed through the drying-room and pass outward at the lower end thereof upon its supporting label-carrier with the said carrier. The length of time that any given label remains in the drying-room may be increased or diminished, as it is found expedient, by varying the speed of the conveying apparatus, or by varying the length of the conveyer within the drying-room.

Outside of and at that end of the drying-room where the carriers emerge therefrom are two uprights $c$ $c$, in which is journaled a shaft $c'$. Keyed to one end of this shaft is the main driving-pulley $c^2$, by which power is supplied to the apparatus. Keyed to the said shaft, inside of the said driving-pulley, is the cone-pulley $c^3$, which carries the belt E and transmits power from the shaft $c'$ to another portion of the apparatus. The said shaft $c'$ also carries two gear-wheels $c^4$ at opposite ends of the said shaft, one of which is shown in Fig. 3. Two other gear-wheels $c^5$ are mounted directly above and mesh with the said gear-wheels $c^4$ upon short shafts $c^6$, each journaled in two bearings, one of which, $c^7$, is supported by the frame-upright $c$, the other of which, $c^9$, is rigidly attached to the upright D. Each of the short shafts $c^6$ carries a sprocket-wheel $c^8$, hereinabove referred to as supplying motion to the sprocket-chains $B^3$.

Inside of the two frame-pieces C are placed the two upright supports D, connected with the end of the drying-room by the braces $D^4$. In the upper ends of these upright supports D are journaled the two sprocket-wheels $B^5$, hereinabove referred to. Toward the lower end of the said uprights D are journaled two sprocket-wheels $D'$. The wheel-brackets $D^3$, projecting from the lower end of the said uprights D, carry the sprocket-wheels $D^2$, which have a horizontally-adjustable mounting in the said brackets. The wheels $D'$ and $D^2$ serve as guides for the sprocket-chains along this portion of their course. The wheels $D^2$, by virtue of their adjustable mounting, enable the tension of the sprocket-chains to be increased or diminished. Additional guides for the said chains during their upward passage outside the drying-room are provided by the guide-strips $d'$ and $d^3$, attached to the uprights D by the braces $d$ and $d^2$, respectively.

The mechanism for unloading the dried labels from the carriers is shown in detail in plan view, Fig. 5. The belt E, hereinabove referred to, transmits motion to the cone-pulley $E'$, mounted upon a shaft $E^2$. The motion of this shaft may be transmitted by a belt $E^3$ to a second shaft $E^4$, which is suitably journaled upon the frame-pieces F. The said shaft $E^4$ carries pulleys $E^5$, which give their motion to the tapes $E^6$. The said tapes pass over pulleys $E^7$, which are journaled in brackets $E^8$, rigidly attached to the cross-bar $E^9$, which is carried by two supports $F^3$, attached to the said frame-pieces F.

Between the frame-pieces F are mounted slats $F'$, of equal length, and the two longer slats $F^2$. In the operation of my apparatus as each carrier B passes out from the drying-room it reaches the position illustrated in Fig. 5, at which point it has an upward motion. This motion brings the edge of the label upon the said carrier in contact with the under sides of the tapes $E^6$, which under sides travel away from the carrier and carry with them the label over the slats $F'$ and deposit the label upon the vibrating platform G. The said platform G is provided with transverse slats $g$. It is supported upon two uprights $G'$, one end of each of which rods is journaled in an arm $G^2$, which is pivotally supported from an upright $G^3$, mounted upon the framework $G^4$ of this portion of my apparatus. A vibrating motion is imparted to the said platform G in the direction of its length by pivoting to one of the arms $G^2$ one end of the rod $g'$, the other end of which connects with one end of the lever $g^2$, pivoted at $g^3$ to the said framework $G^4$. The other end of the lever $g^2$ is connected by the rod $g^4$ with a bell-crank lever $g^5$, which receives the reciprocating motion of the rod $g^6$, which may be suitably connected with the power supply of my apparatus and transmits the said motion to the vibrating platform G.

Arranged opposite one end of the vibrating platform and in continuation of its length are the frame-pieces H, connected by the cross-pieces $H'$. Upon the frame-pieces H are journaled two shafts $H^2$ and $H^3$, carrying the pulleys $H^4$ and $H^5$, respectively, the said pulleys carrying and imparting motion to the endless tapes $H^6$. Motion may be imparted to the shaft $H^2$ in any convenient way, as by the pulley $h^3$, belt $h^4$, the guide-pulley $h^5$, and the pulley $h^6$, keyed on the shaft $E^2$, hereinabove referred to. The cross-pieces $H'$ support two guide-strips $H^7$, the projections of which, $h^2$, extend downward under the adjacent end of the vibrating platform G. Between the guide-strips $H^7$ and parallel therewith are placed the slats $h$, the ends of which, under the shaft $H^3$ and pulleys $H^5$, are curved downward.

Upon the cross-pieces $H'$, in continuation of the guide-strips $H^7$, are placed the guide-strips I. Between the strips I a space is left, which is adapted to receive the trays I', which can be withdrawn and replaced at will.

The operation of these mechanisms last described is as follows: When a label has been carried forward by the tapes $E^6$ into the vibrating platform G, it is thrown forward by the said platform, so that one end of the said label is caught between the slats $h$ and the lower plies of the tapes $h^6$, which are traveling away from the said platform G. The label is carried by the said tape along the slats $h$ and deposited upon the tray I' (shown in Fig. 7) somewhat below the level of said slats. When the tray I' has received a sufficient number of labels, it may be removed and replaced by another tray.

From this description of the construction and operation of my apparatus it will be seen that the same is automatic throughout. When once the labels have been placed upon the feeding-apron $A^2$, they will be loaded upon the conveyer, conveyed through the drying-room and dried, unloaded, and delivered upon the trays I' without further attention.

The above description and the accompanying drawings show one specific form of construction for embodying my invention. I do not, however, limit myself to the specific devices so shown and described; but

What I claim, and desire to secure by Letters Patent, is—

1. In a drying apparatus, a drying-room; an endless conveyer, comprising the chains $B^3$, wheels over which the said chains are adapted to pass, a series of carriers B pivotally suspended from the said chains $B^3$, so as to retain a constant horizontal position; devices for loading the said carriers successively before they pass into the drying-room; and devices for unloading said carriers successively as they emerge therefrom.

2. In a drying apparatus, an endless conveyer, comprising two sprocket-chains $B^3$, wheels $B^6$ $B^7$ over which the said sprocket-chains are adapted to pass, and carriers B suspended between and pivoted upon the said sprocket-chains so as to retain a horizontal position, whatever be the direction of the said sprocket-chains.

3. In a drying apparatus, an endless conveyer, comprising the sprocket-chains $B^3$, wheels over which the said sprocket-chains are adapted to pass, links $b^3$ formed at intervals in the said sprocket-chains, provided with pins $b^4$, and carriers B mounted between the sprocket-chains pivotally upon the said pins $b^4$.

4. In a drying apparatus, an endless conveyer, comprising sprocket-chains $B^3$, wheels over which the same are adapted to pass, and a series of carriers B formed each of a bar B', provided at its ends with ears $B^2$, adapted to be pivotally connected with links of the sprocket-chains; and cross-slats $b$.

5. In an apparatus for drying labels, an endless conveyer, comprising the chains $B^3$ and a series of carriers B suspended between the chains, each of said carriers consisting of a bar B' and cross-slats $b$, in combination with mechanism for loading the said carriers as they move upwardly, consisting of fingers between which the slats of the carriers pass as the carrier ascends; and conveyers for moving forward the articles to be loaded upon the said fingers.

6. In a labeling and drying apparatus, an endless conveyer comprising the chains, $B^3$; and a series of carriers B, supported therefrom, each carrier comprising the bar, B', and the cross-slats, $b$; in combination with mechanism for unloading successively the said carriers, consisting of the endless moving tapes, $E^6$, and the slats, F, between the ends of which the ends of the cross-slats, $b$, of the carrier pass.

7. In an apparatus for drying labels, an unloading mechanism comprising the tapes, $E^6$, and the slats, F, the vibrating platform, G, and the tapes, $H^6$, and the slats, $h$, arranged and operating substantially as described.

CHARLES B. McDONALD.

In presence of—
ALOYSIA HELMICH,
A. A. MURRAY.